(12) United States Patent
Pujari et al.

(10) Patent No.: US 8,334,062 B1
(45) Date of Patent: Dec. 18, 2012

(54) ENVIRONMENTAL BARRIER COATING

(75) Inventors: Vimal K. Pujari, Northboro, MA (US);
Ara Vartabedian, Hudson, MA (US);
William T. Collins, Auburn, MA (US);
David Woolley, Ayer, MA (US); Charles Bateman, Rutland, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1336 days.

(21) Appl. No.: 12/024,522

(22) Filed: Feb. 1, 2008

Related U.S. Application Data

(60) Provisional application No. 60/899,306, filed on Feb. 2, 2007.

(51) Int. Cl.
*B32B 9/04* (2006.01)
*B32B 13/04* (2006.01)
*B32B 9/00* (2006.01)
*B32B 19/00* (2006.01)

(52) U.S. Cl. ........ 428/702; 428/446; 428/448; 428/699; 428/701

(58) Field of Classification Search .................. 428/446, 428/448, 699, 701, 702
See application file for complete search history.

(56) References Cited

U.S. PATENT DOCUMENTS

| | | | |
|---|---|---|---|
| 6,312,763 B1 | 11/2001 | Eaton, Jr. et al. | |
| 6,645,649 B2 | 11/2003 | Tanaka et al. | |
| 6,682,821 B2 * | 1/2004 | Fukudome et al. | 428/446 |
| 2006/0073361 A1 * | 4/2006 | Fukudome et al. | 428/698 |

OTHER PUBLICATIONS

International Preliminary Report on Patentability dated Aug. 4, 2009 issued in corresponding PCT application No. PCT/US2008/052783, 9 pages.

* cited by examiner

*Primary Examiner* — Jonathan Langman
(74) *Attorney, Agent, or Firm* — Abel Law Group, LLP; Robert T. Conway

(57) ABSTRACT

The present invention relates generally to a multi-layered article suitable for service in severe environments. The article may be formed of a substrate, such as silicon carbide and/or silicon nitride. The substrate may have a first layer of a mixture of a rare earth silicate and Cordierite. The substrate may also have a second layer of a rare earth silicate or a mixture of a rare earth silicate and cordierite.

23 Claims, 3 Drawing Sheets

ENVIRONMENTAL BARRIER COATING

RELATED APPLICATIONS

This application claims priority under 35 U.S.C. §119(e) to U.S. Provisional Application Ser. No. 60/899,306 filed on Feb. 2, 2007, entitled "ENVIRONMENTAL BARRIER COATING," which is herein incorporated by reference in its entirety for all purposes.

FEDERALLY SPONSORED RESEARCH

The Government of the United States of America has rights in this invention pursuant to Subcontract No. 44000017386 awarded by or for the U.S. Department of Energy under Prime Contract No. DE-AC05-00OR22725.

BACKGROUND OF INVENTION

1. Field of Invention

The present invention is directed to a multilayer system for protecting components exposed to environmental and thermal conditions and, particularly, barrier coating for components for heat engines, such as gas turbine engines.

2. Background

Ceramics are commonly used in high temperature structural applications such as gas turbine engines, internal combustion engines, and heat exchangers. In particular, silicon containing ceramics are often used in such extreme conditions, but are prone to rapid recession in combustion environments in which water vapor is typically produced.

Temperature capability of structural components exposed to environmental and thermal conditions limit efficiency and emissions of gas turbine engines. Components used in gas turbine engines, which may be exposed to temperatures in excess of 1000° C., should be strong and resist corrosion due to exposure to air streams as well as abrasion and shock resistance against collision with fine particles. In particular, components such as turbine rotors, turbine blades, nozzles, combustors, scrolls, nozzle supports, seal rings, spring rings, diffusers, ducts and shrouds in the engine hot section are susceptible to coating loss from spallation or erosion.

Silicon containing ceramics typically form a slow forming silica ($SiO_2$) scale in clean oxidizing environments. However, water vapor, molten salts, or a reducing atmosphere present in the environment may react with the silica scale to form liquid silicates. Oxygen may then diffuse through the liquid silicate and oxidize the ceramic substrate. High water vapor levels result in the formation of hydrated silica species ($Si(OH)x$) and subsequent evaporation of the silica scale. Oxidizing and reducing gases in complex combustion atmospheres generate $SiO(g)$ directly or $SiO_2$ which is reduced to $SiO(g)$. To reduce the rate of recession, ceramics may be coated as, for example, disclosed in U.S. Pat. No. 6,759,151 issued to Lee; U.S. Pat. No. 6,682,821 issued to Fukudome et al.; and U.S. Pat. No. 6,645,649 issued to Tanaka et al.

SUMMARY OF INVENTION

The present invention generally relates to a multilayer system for protecting components.

The present invention provides, in one embodiment a multilayer article comprising a substrate, a first layer overlying at least one surface of the substrate, and a second layer overlying the first layer. The first layer comprises a first rare earth silicate and cordierite, and the second layer comprises a second rare earth silicate and up to about 12 percent, by weight, of cordierite.

In another embodiment, the present invention provides a multilayer article comprising a substrate, a first coating adjacent at least one surface of the substrate, and a second coating adjacent the first coating. The first coating consists essentially of a first rare earth silicate and cordierite, and the second coating comprises a second rare earth silicate.

Figure 1A:
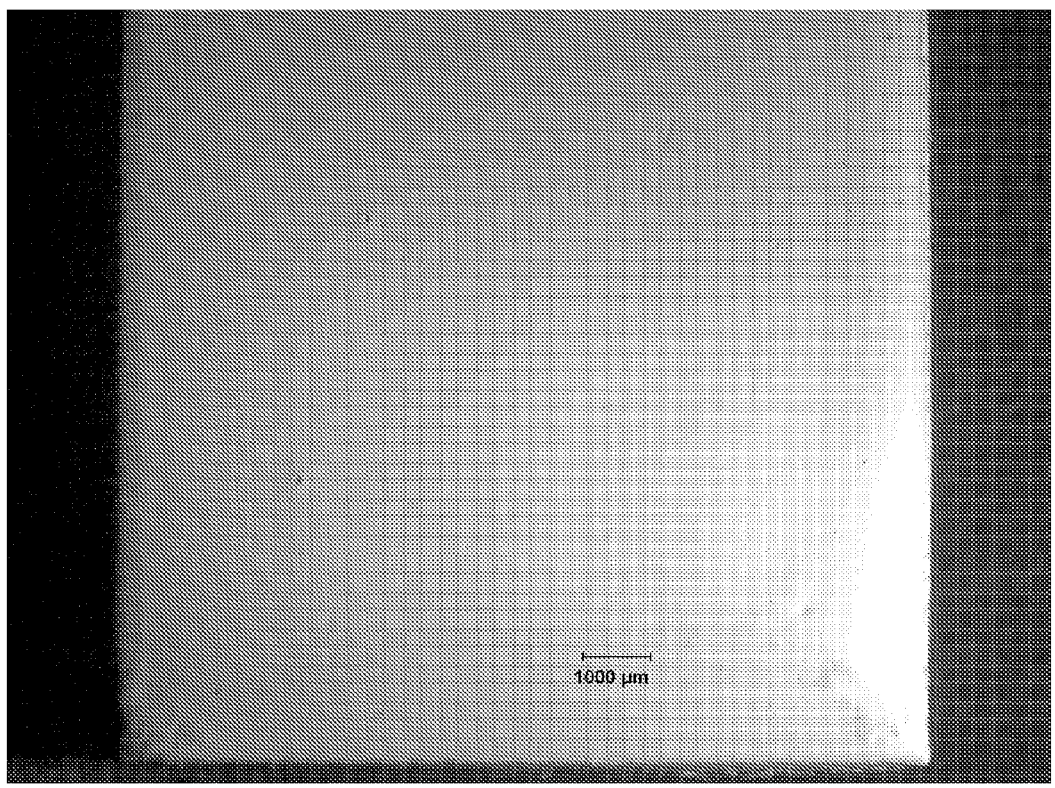
FIG. 1a is a micrograph of one sample of the present invention.

Other advantages, novel features and objects of the invention will become apparent from the following detailed description of the invention when considered in conjunction with the accompanying drawing.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In accordance with one or more embodiments, the present invention relates generally to a multilayer article suitable for service in environmental and thermal conditions. For example, the article may be exposed to humid conditions. Alternatively, the article may be exposed to high temperature conditions, such as 1000° C. or higher. During service, the article may be exposed to high velocity conditions of 5 m/sec to 50 m/sec. In one embodiment the article may be exposed to any two or more conditions of humidity, high temperature, and high velocity. One example of severe environmental conditions includes a gas jet turbine environment with humid, high velocity (5 m/sec to 50 m/sec.), and high temperature (greater than about 1000° C.) conditions.

Embodiments of the present invention may generally comprise an article formed of a substrate. The substrate may by any material suitable for a particular purpose. In one embodiment, the material may be suitable for high temperature and/or or high pressure structural applications. For example, the substrate may be a ceramic or a silicon-containing metal alloy. In one embodiment, the substrate is a silicon containing ceramic, such as silicon nitride, silicon carbide, silicon oxynitride including silicon aluminum oxynitride, and combinations thereof. In one embodiment, the substrate may be silicon carbide having a coefficient of thermal expansion (CTE) of about $4.5\times10^{-6}/°$ C. In another embodiment, the substrate may be silicon nitride having a CTE of about $3.3\times10^{-6}/°$ C. In another embodiment, the substrate may comprise at least about 50 percent, by weight, of silicon nitride. In another embodiment, the substrate consists essentially of silicon nitride.

The substrate may be partially or entirely overlaid with two or more layers of a mixture comprising cordierite and a rare earth silicate. As is known in the art, the mineral cordierite is magnesium aluminum silicate or $Mg_2Al_4Si_5O_{18}$ and has a CTE of about $2.48 \times 10^{-6}/°$ C. As used herein, references to cordierite or any other material such as a rare earth silicate is meant to include the pure form of the material as well as forms including impurities. An amount of cordierite in each layer may decrease as that layer is further removed from the substrate. Accordingly, the amount of the rare earth silicate may increase in each layer as that layer is further removed from the substrate. The final outer layer may, but need not, comprise cordierite. Alternatively, the amount of cordierite in each layer may increase as that layer is further removed from the substrate. Accordingly, the amount of the rare earth silicate may decrease in each layer as that layer is further removed from the substrate.

In one embodiment, cordierite may be layered on one or more surfaces of the substrate forming a first layer. In one embodiment, the first layer may cover all surfaces of the substrate. In another embodiment, the first layer may be a coating disposed on the surface of the substrate. The first layer of cordierite overlaying the substrate may be a mixture of cordierite and a rare earth silicate. In one embodiment, the mixture of rare earth silicate and the ratio of the rare earth silicate to cordierite may be selected to provide a composition having a CTE similar to that of the substrate. In another embodiment, the mixture of rare earth silicate and the ratio of the rare earth silicate to cordierite may be selected to provide an intermediate CTE, between that of the substrate and that of any additional layers. Providing a first layer having an intermediate CTE or a CTE similar to that of the substrate may reduce or eliminate inter layer stresses between the outer layer and the substrate during formation of the layer or in service operation of the article, which may lead to premature failure.

The rare earth silicate may be any of $RE_2Si_2O_7$, $RE_2SiO_5$, and combinations thereof, where RE is a rare earth element. The rare earth element may be selected from any rare earth element suitable for a particular purpose. In one embodiment, the rare earth element may be any one of yttrium (Y), ytterbium (Yb), erbium (Er), samarium (Sm), dysprosium (Dy), lutetium (Lu), and cerium (Ce). In one embodiment, the rare earth element is Yttrium. In yet another embodiment, the first layer consists essentially of cordierite and the rare earth silicate. As used herein, the phrase "consisting essentially of" is used to list major components of a mixture, and is not meant to exclude impurities or trace levels of components which do not affect one or more characteristics of the mixture.

The first layer adjacent the substrate may have a CTE similar to that of a CTE of the substrate. In one embodiment, the first layer may have a CTE ranging between and including about $3.2 \times 10^{-6}/°$ C. to about $4.0 \times 10^{-6}/°$ C. In another embodiment, the first layer may have a CTE ranging between and including about $3.6 \times 10^{-6}/°$ C. to about $4.0 \times 10^{-6}/°$ C. In yet another embodiment, the CTE of the first layer may range between and including about $3.8 \times 10^{-6}/°$ C.

In one embodiment, the first layer may comprise at least about 6 percent, by weight of cordierite. In another embodiment, the first layer may comprise between and including about 6 percent, by weight, and about 43 percent, by weight, of cordierite. In yet another embodiment, the first layer may comprise between and including about 12 percent, by weight of cordierite and about 25 percent, by weight, of cordierite. In one embodiment, the first layer may comprise about 12 percent, by weight, of cordierite. In another embodiment, the first layer may comprise about 25 percent, by weight, of cordierite.

In one embodiment, the first layer may comprise at least about 50 percent, by weight, of the rare earth silicate. In another embodiment, the first layer may comprise between and including about 57 percent, by weight, and about 94 percent, by weight, of the rare earth silicate. In yet another embodiment, the first layer may comprise between and including about 57 percent, by weight, and about 88 percent, by weight, of the rare earth silicate. In another embodiment, the first layer may comprise about 75 percent, by weight, of the rare earth silicate. In yet another embodiment, the first layer may consist essentially of the rare earth silicate and cordierite.

A second layer comprising a rare earth silicate may overlay a portion or the entire first layer and may form a coating disposed on the first layer. The second layer may, but need not, comprise cordierite. The rare earth silicate in the second layer may be any rare earth silicate suitable to withstand a severe environment. The rare earth silicate may be any of $RE_2Si_2O_7$, $RE_2SiO_5$, and combinations thereof, where RE is a rare earth element. The rare earth element may be selected from any rare earth element suitable for a particular purpose. In one embodiment, the rare earth element may be any one of Yttrium (Y), ytterbium (YB), Erbium (Er), Samarium (Sm), Dysprosium (Dy), Lutetium (Lu) and Cerium (Ce). In one embodiment, the rare earth element is Yttrium. The rare earth silicate in the second layer may, but need not, be the same rare earth silicate present in the first layer.

In one embodiment, the second layer may comprise up to and including about 12 percent, by weight, cordierite. In another, the second layer may comprise up to and including about 6 percent, by weight, of cordierite. In yet another embodiment, the second layer may comprise up to and including about 3 percent, by weight, of cordierite. In yet another embodiment, the second layer may not include any appreciable amount of cordierite. As used herein, the phrase "appreciable amount" is defined as an amount of cordierite that effects one or more characteristics of the rare earth silicate, and is not meant to include trace amounts of cordierite.

In one embodiment, the second layer may comprise up to and including about 100 percent, by weight, of the rare earth silicate. In another embodiment, the second layer may comprise up to and including about 97 percent, by weight, of the rare earth silicate. In another embodiment, the second layer may comprise up to and including about 94 percent, by weight, of the rare earth silicate. In yet another embodiment, the second layer may comprise up to and including about 88 percent, by weight, of the rare earth silicate.

The second layer may have a CTE between and including about $3.6 \times 10^{-6}/°$ C. to about $4.1 \times 10^{-6}/°$ C. In another embodiment, the second layer may have a CTE between and including about $3.9 \times 10^{-6}/°$ C. to about $4.1 \times 10^{-6}/°$ C. In yet another embodiment, the second layer may have a CTE of about $4.0 \times 10^{-6}/°$ C.

In one embodiment, the percent, by weight, of cordierite present in the second layer may be less than the percent, by weight, of the cordierite present in the first layer. Without being bound by any particular theory, the presence of cordierite in the first layer may improve the bond between the second layer and the substrate, by providing a layer having a CTE greater than that of the substrate, but less than that of the second layer. The presence of cordierite in the second layer may perhaps strengthen the bond of the second layer to the first layer. However, presence of cordierite in the second layer, which may be directly exposed to severe environments, may also adversely affect the recession rate of the second layer. In applications in which it is desirable to include cordierite in the second layer, a trade off in inter-layer bond strength and recession rate may result.

Mixtures of cordierite and the rare earth silicate may be prepared by dry mixing commercially available powders. Powdered cordierite may have an average particle size of less than or equal to about 2.6 micron. Powdered Yittrium may have an average particle size of less than or equal to about 1 micron. In one embodiment, the powder may have an average particle size of about 0.5 micron. Powders may be formed from aggregates milled and screened to produce a desired particle size. A sol gel of the powder in tetraethyl ortho silicate (TEOS) may be formed, calcined, and milled to produce the powder or powder mixture of cordierite and the rare earth silicate.

The first and/or second layers may be formed on the substrate by known methods, such as dip, pack cementation, chemical vapor deposition (CVD), plasma vapor deposition (PVD), slurry spray coating. In one embodiment, the article to be coated may be dipped in a slurry containing the rare earth silicate and/or the mixture of the rare earth silicate and cordierite.

Each of the first and second layers may have a thickness between and including about 2 microns to 100 microns. The thickness of the first layer may, but need not, be the same as the thickness of the second layer. In one embodiment, the thickness of the first layer is less than the thickness of the second layer. In another embodiment, the thickness of the first layer is greater than the thickness of the second layer. In one embodiment, the combined thickness of the first and the second layers may range between and including about 5 microns and about 200 microns. In another embodiment, the first and second layers may have a thickness between and including about 20 microns to about 50 microns. In another embodiment, the combined thickness of the first and second layers may range between and including about 50 and about 200 microns.

Powders of rare earth silicates and mixtures of rare earth silicates and cordierite may be formed into slurries for dip coating. Slurries for dip coating may be water, solvent or polymer precursor based and may include processing aids and binders, such as polyethylene glycol (PEG) and polyphenylene vinylene (PPV). Coatings applied by the dipping process, may be further densified by known methods, such as reactive sintering, microwave sintering, and/or hot isostatic pressing (HIP).

In one embodiment, a substrate may be dipped in a water, solvent or polymer based slurry containing the mixture of the rare earth silicate and cordierite, and dried. The coated substrate may be sintered between and including about 1,200° C. and about 1,400° C., and then cooled. In one embodiment, the coated substrate may be heated and/or cooled at a rate of about 10° C. to about 15° C. per minute to or from the sintering temperature. In one embodiment, the layered substrate is sintered at a temperature of about 1,325° C. The substrate may be maintained at the sintering temperature for about 1 hour to about 3 hours. Sintering may occur in a reducing environment. In one embodiment, the layer may be sintered in Argon, oxygen or air. The coated substrate may then be dipped in a slurry containing the rare earth silicate or the mixture of the rare earth silicate and cordierite, dried, and sintered.

Without being bound by any particular theory, the presence of cordierite in the first layer may reduce undesirable interface stresses at the surface of the substrate and/or at the interface with the second layer. Cordierite may also act as a liquid phase sintering aid and may allow the coating to plastically deform during densification thereby relieving stresses and reducing the likelihood of crack formation due to shrinkage during densification.

EXAMPLES

The invention may be further understood with reference to the following examples, which are intended to serve as an illustration only, and not as limitations of the present invention as defined in the claims herein.

Example I

Figure 1B:
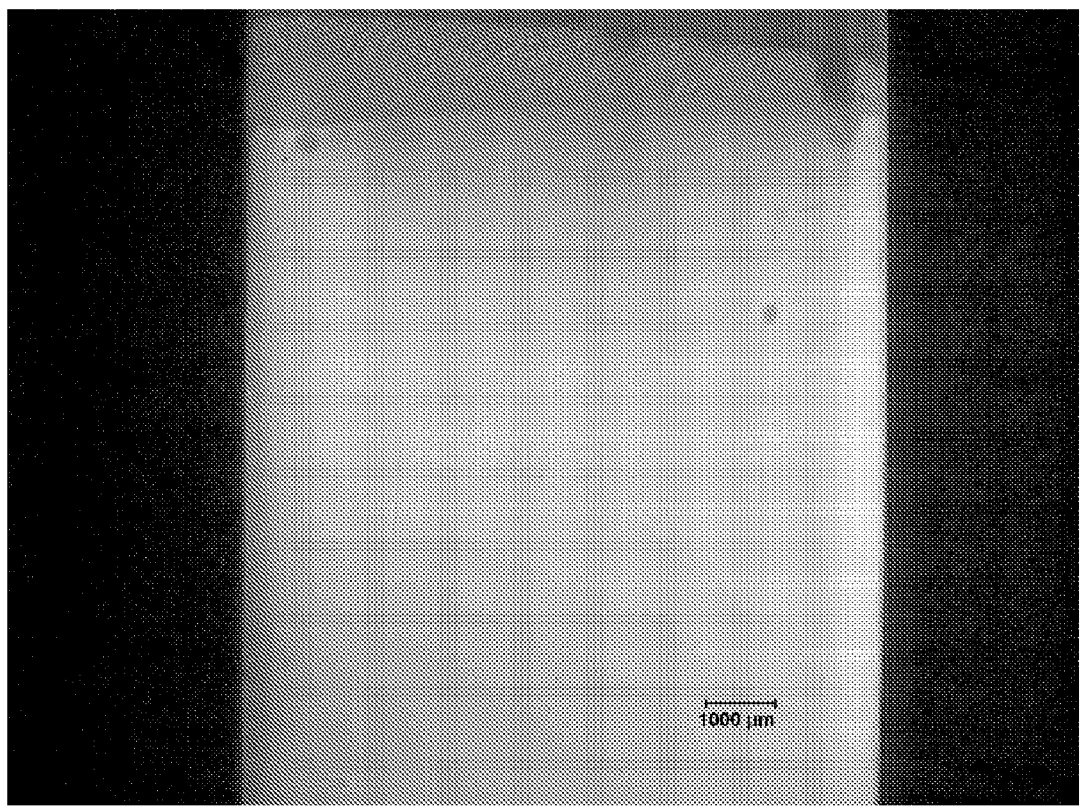
FIG. 1b is a micrograph of another sample of the present invention.

FIGS. 1a and 1b are micrographs showing embodiments of the present invention in which silicon nitride is coated with a first layer containing cordierite and $Y_2Si_2O_7$ and a second layer of $Y_2Si_2O_7$. Test coupons of silicon nitride of about 30 mm×12 mm×5 mm were dip coated using one of four aqueous slurries of powdered compositions 1-4. Each slurry contained about 30 volume percent of the respective powered sample 1-4 of $Y_2Si_2O_7$ and cordierite, about 1 weight percent of Darvan 821, a surfactant available from R. T. Vanderbilt Company, Inc., Norwalk, Conn., and the remaining volume percent of water. The viscosity of the slurries ranged from about 50 cps to about 100 cps. After dip coating, the test coupons were sintered at about 1,300° C. Each sample was then dip coated to form a second layer of $Y_2Si_2O_7$, dried and sintered again at about 1,300° C. As seem in FIGS. 1a and 1b, the coating formed are free from cracks, indicating that the intermediate layer may have reduced potential stresses between the silicon nitride substrate and the $Y_2Si_2O_7$ outer layer.

Example II

Hot pressed monoliths of four potential coating compositions, listed in Table I, were prepared. The coating composition powders were mixed in an aqueous solution and dried to form a powder. The powder was used to form 3 in. by 3 in. plates by hot pressing at about 1,300° C. to about 1,500° C. for one hour in nitrogen at 3.3 ksi. The plates were machined into test coupons and used to evaluate material properties such as microstructure, density, CTE and environmental stability.

TABLE I

| Sample | Wt. % $Y_2Si_2O_7$ | Wt. % cordierite | CTE × $10^{-6}$/° C. |
| --- | --- | --- | --- |
| 1 | 100 | 0 | 4.10 |
| 2 | 88 | 12 | 3.84 |
| 3 | 94 | 6 | 3.98 |
| 4 | 57 | 43 | 3.24 |

As can be seen from Table I, an increase in percent, by weight, of cordierite lowered the CTE of the sample when compared to 100 percent, by weight, $Y_2Si_2O_7$, allowing compositions of to be tailored to a desired CTE.

Figure 2:
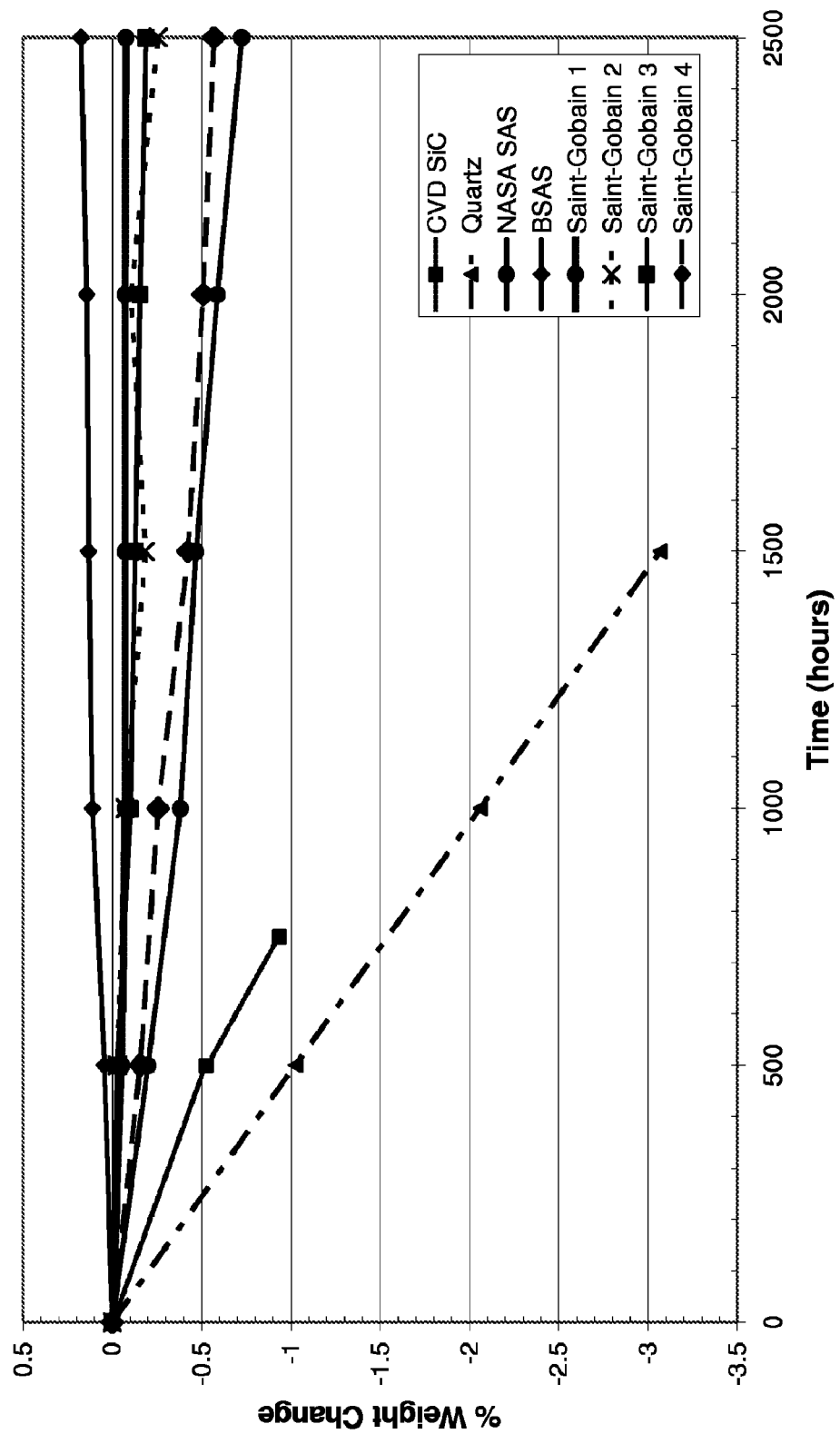
FIG. 2 is a graph showing recession rates of various compositions of the present invention.

High Pressure Keiser Rig Testing of Samples 1-4 was performed with results shown in FIG. 2. The tests were performed at 1250° C., 18 atm water vapor, 20 atm total pressure, and at a low flow of 33 $10^{-4}$ m/s for a total of 2,500 hours. For comparison, samples of quartz, and chemical vapor deposition silicon carbide were also tested and results reported in FIG. 2. As seen in FIG. 2, Sample 1 had a weight loss of about 0.06 percent, Sample 2 had a weight loss of about 0.25 percent, Sample 3 had a weight loss of about 0.12 percent and Sample 4 had a weight loss of about 0.56 percent after an exposure of 2,500 hours. In comparison, the quartz sample had a weight loss of about 3 percent after only 1,500 hours and silicon carbide had a weight loss of about 0.57 percent after an exposure of less than 1000 hours. As seen in FIG. 2, an increase in percent, by weight, of cordierite increased the percent weight loss of the sample.

Extrapolation of the test data in FIG. 2 to 10,000 hours resulted in a recession rate of Sample 1 of 4 microns, Sample 2 of 12 microns, Sample 3 of 9 microns, Sample 4 of 32 microns, and chemical vapor deposition of silicon carbide of 157 microns.

The results shown in FIG. 2 indicate that any of Samples 2-4 may be used as a first layer and any of Samples 1-3 may be used as a second layer which may be exposed to severe environmental conditions. For example, in one embodiment, the substrate may be coated with a first layer having a composition of Sample 4 and then with a second layer having a composition of any of Samples 1-3. Likewise, the substrate may be coated with a first layer having a composition of Sample 2, and then with a second layer having a composition of any of Samples 1 and 3. In another embodiment, the substrate may be coated with a first layer having a composition of Sample 3 and a second layer having a composition of any of Samples 1-2 and 4.

Having thus described several aspects of at least one embodiment of this invention, it is to be appreciated various alterations, modifications, and improvements will readily occur to those skilled in the art. For example, other layers in addition to the first and second layers noted above may be applied to the substrate, and may provide a sequential reduction or increase in the amount of cordierite present in each layer as the layer becomes further removed from the substrate. Such alterations, modifications, and improvements are intended to be part of this disclosure, and are intended to be within the spirit and scope of the invention. Accordingly, the foregoing description and drawings are by way of example only.

What is claimed is:

1. A multilayer article comprising:
    a substrate having a substrate coefficient of thermal expansion;
    a first layer immediately adjacent to at least one surface of the substrate, the first layer comprising a first rare earth silicate and cordierite, wherein the first layer has a first coefficient of thermal expansion that is a same or greater than the substrate coefficient of thermal expansion; and
    a second layer immediately adjacent to the first layer, the second layer comprising a second rare earth silicate and up to about 12 percent, by weight, of cordierite, wherein the second layer lies at an exposed surface of the multilayer article, the second layer has a second coefficient of thermal expansion that is a same or greater than the first coefficient of thermal expansion, and the second coefficient of thermal expansion is greater than the substrate coefficient of thermal expansion.

2. The article of claim 1, wherein the substrate comprises a silicon containing ceramic.

3. The article of claim 2, wherein the silicon containing ceramic is selected from the group consisting of silicon nitride, silicon carbide, silicon oxinitride, and combinations thereof.

4. The article of claim 1, wherein the first layer comprises greater than about 50 percent, by weight, of the first rare earth silicate.

5. The article of claim 4, wherein the first layer comprises a balance of cordierite.

6. The article of claim 1, wherein the first layer comprises from about 12 percent, by weight, to about 25 percent, by weight, of cordierite.

7. The article of claim 6, wherein the first layer comprises about 25 percent, by weight, of cordierite.

8. The article of claim 1, wherein the second layer comprises up to about 6 percent, by weight, cordierite.

9. The article of claim 8, wherein the second layer comprises up to about 3 percent, by weight, cordierite.

10. The article of claim 1, wherein the first rare earth silicate is a silicate selected from the group consisting of $RE_2SiO_5$, $RE_2Si_2O_7$, and combinations thereof, wherein RE is a rare earth element selected from the group consisting of yttrium, ytterbium, erbium, samarium, dysprosium, lutetium, and cerium.

11. The article of claim 10, wherein the RE is yttrium.

12. The article of claim 1, wherein the first rare earth silicate and the second rare earth silicate are $RE_2Si_2O_7$.

13. The article of claim 1, wherein the first rare earth silicate and the second rare earth silicate are $Y_2Si_2O_7$.

14. The article of claim 1, wherein the first coefficient of thermal expansion is from about $3.2\times10^{-6}/°$ C. to about $4.0\times10^{6}/°$ C.

15. The article of claim 1, wherein the second coefficient of thermal expansion is from about $3.6\times10^{-6}/°$ C. to about $4.1\times10^{-6}/°$ C.

16. A multilayer article comprising:
    a substrate having a substrate coefficient of thermal expansion; and
    a plurality of layers, wherein:
        a first layer of the plurality of layers is adjacent at least one surface of the substrate and closer to the substrate than any other layer within the plurality of layers, the first layer comprising a first rare earth silicate and cordierite, wherein the first layer has a first coefficient of thermal expansion; and
        a second layer of the plurality of layers is farther from the substrate than any other layer within the plurality of layers and comprises a second rare earth silicate, wherein the second layer has a second coefficient of thermal expansion; and
        the first coefficient of thermal expansion is a same or greater than the substrate coefficient of thermal expansion, each succeeding layer that is farther from the substrate has a coefficient of thermal expansion that is a same or greater than a coefficient of thermal expansion of an immediately preceding layer, and the second coefficient of thermal expansion is greater than the substrate coefficient of thermal expansion.

17. The article of claim 16, wherein the first layer comprises from about 12 percent, by weight, to about 25 percent, by weight, of cordierite.

18. The article of claim 16, wherein the second layer comprises up to about 6 percent, by weight, cordierite.

19. The article of claim 16, wherein the first rare earth silicate is a silicate selected from the group consisting of $RE_2SiO_5$, $RE_2Si_2O_7$, and combinations thereof, wherein RE is a rare earth element selected from the group consisting of yttrium, ytterbium, erbium, samarium, dysprosium, lutetium, and cerium.

20. The article of claim 16, wherein the first rare earth silicate and the second rare earth silicate are $RE_2Si_2O_7$.

21. The article of claim 16, wherein the first rare earth silicate and the second rare earth silicate are $Y_2Si_2O_7$.

22. The article of claim 16, wherein the first coefficient of thermal expansion is from about $3.2\times10^{-6}/°$ C. to about $4.0\times10^{-6}/°$ C.

23. A multilayer article comprising:
a substrate;
a first coating adjacent at least one surface of the substrate, the first coating consisting essentially of a first rare earth silicate and cordierite, wherein the first layer has a coefficient of thermal expansion from about $3.2\times10^{-6}/°$ C. to about $4.0\times10^{-6}/°$ C.; and
a second coating comprising a second rare earth silicate adjacent the first coating, wherein the second layer has a coefficient of thermal expansion from about $3.9\times10^{-6}/°$ C. to about $4.1\times10^{-6}/°$ C.

* * * * *